May 21, 1968 W. H. BLOCK 3,383,960
REPAIR DEVICE FOR ELASTOMERIC PRODUCTS
Filed Oct. 22, 1965
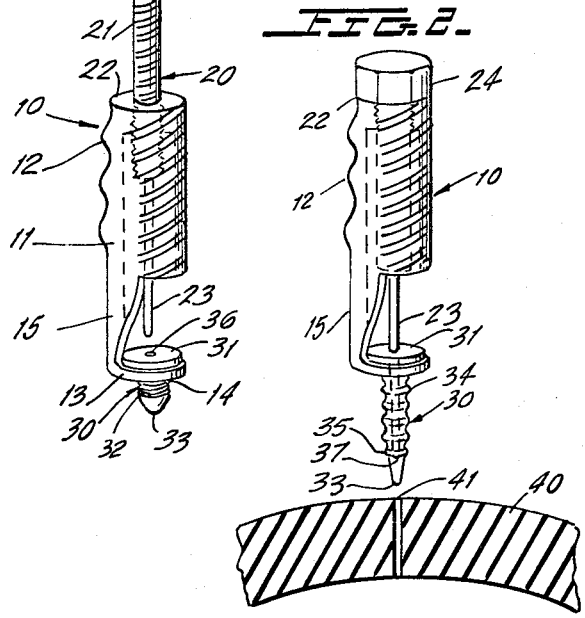
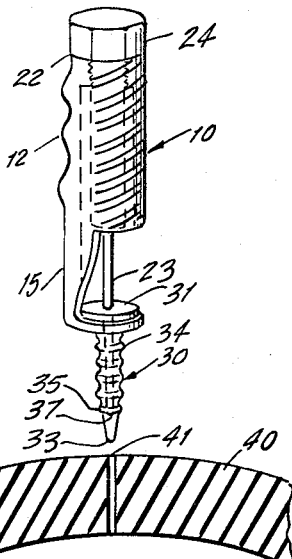
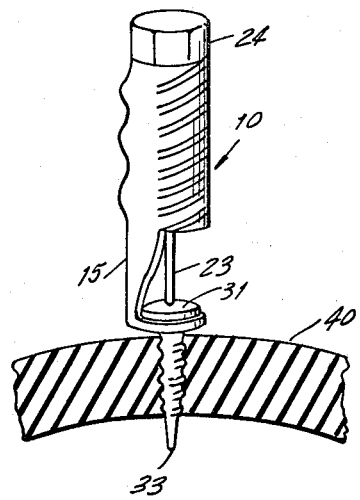
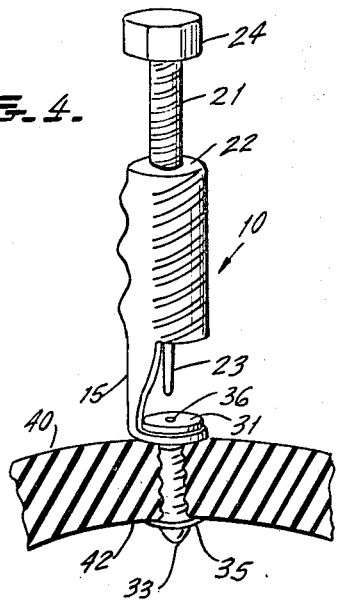
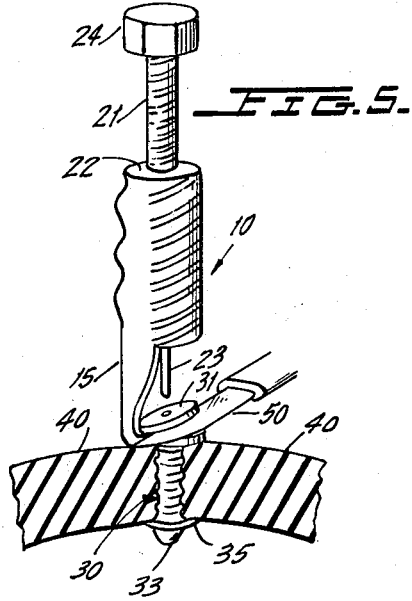
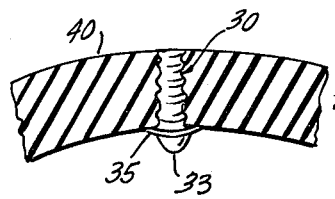
INVENTOR.
WILLIAM H. BLOCK
BY
OSTROLENK, FABER, GERB & SOFFEN
ATTORNEYS

United States Patent Office 3,383,960
Patented May 21, 1968

3,383,960
REPAIR DEVICE FOR ELASTOMERIC
PRODUCTS
William H. Block, 57 Bank St.,
New York, N.Y. 10014
Filed Oct. 22, 1965, Ser. No. 500,916
1 Claim. (Cl. 81—15.7)

ABSTRACT OF THE DISCLOSURE

Punctures in elastomeric products, such as inflatable tubeless tires may be repaired by inserting a flexible and expandable plug into the puncture aperture by means of a device which stretches the puncture plug prior to insertion in such a manner that after insertion, when the longitudinal stretching force is removed the plug contracts longitudinally but expands laterally in such a manner as to provide a tight seal.

---

The present invention relates to a device for repairing punctures in elastomeric products, and, more particularly, to a device for inserting a flexible repair plug into a puncture in, for example, an inflatable tubeless tire. The invention further relates to a method for repairing such a product.

A repair plug has to have a sufficient thickness dimension to completely fill a puncture in a tire or similar elastomeric product. Since the casings of such products are resilient and expandable, a repair plug must be wider than the puncture hole to be filled in order to ensure a tight, effective seal therein.

The repair plugs used in conjunction with prior art devices are relatively inflexible and are not designed to appreciably stretch at any time before or during the puncture repair procedure. Repair plugs of such types thus have substantially fixed length and thickness dimensions. Since, however, the thickness of such a plug must be greater than the diameter of the puncture to be sealed, the casing of the tire or other elastomeric hollow product exerts great frictional resistance to plug insertion. To overcome such problem it has heretofore been thought necessary to design relatively complex and intricate repair plug inserting devices.

Some prior art devices for inserting repair plugs employ puncture hole widening means to prepare a wide, easy-to-enter path for the plug. See, e.g., U.S. Patent 2,990,736 issued on July 4, 1961, to L. Crandall for a "Tire Repair Device." Others use no widening means, but instead require the placement of a metallic protective collar around the repair plug prior to its insertion. See, e.g., U.S. Patent 2,920,515 issued on January 12, 1960, to W. Mays for an "Inflatable Product Repair Device." Such a collar reduces the friction during insertion between the inner surface of the puncture and the surface of the plug being inserted.

No prior art device is, however, known which facilitates the insertion of a repair plug into a puncture without the use of some additional device to either widen the puncture hole or to protect the plug during its passage through the puncture hole. Such repair plugs, or the protective collars surrounding them, must be lubricated on their outer surfaces to facilitate insertion. Moreover, because of the stretching of a puncture hole due to the use of such means, previously available repair plugs do not, in many instances, form tight bonds with the inner surfaces of the punctures to be sealed. Hence, adhesives must frequently be employed to hold such repair plugs securely in puncture holes.

Accordingly, it is among the objects of the instant invention to provide a device, the use of which permits easy insertion of a repair plug into a puncture in an elastomeric product, and which also assures a secure fit between repair plug and puncture.

A further object of the present invention is to provide such a device, which does not require the employment of a pre-insertion puncture hole widening means or a protective collar to surround the repair plug during its insertion, and which requires neither a lubricant to facilitate insertion, nor an adhesive to hold the repair plug securely in the puncture.

Yet an additional object of the invention is to provide a method for repairing punctures in elastomeric products employing such apparatus, which method can be simply and efficiently carried out with optimum results.

These as well as other objects of this invention will become readily apparent from the following detailed description.

The present device for inserting repair plugs into the casings of tubeless tires or other elastomeric products comprises a hollow handle, a shaft extending through such handle, and a support element integral with the handle for fixedly mounting at least one end of a flexible, hollow repair plug annularly thereof. A threaded advance member or similar element is provided for moving the shaft lengthwise of and through the handle and through the plug to thereby stretch and elongate the plug away from the support member, concurrently reducing the thickness of the flexible plug to permit insertion of the same into the puncture in the elastomeric product.

By utilizing such device and employing a hollow flexible plug having one end closed and an opposite flanged end, punctures in such products may be readily sealed. Thus, in accordance with the herein claimed method, such a plug is initially disposed adjacent the puncture to be sealed with the flanged end thereof on the outside of the puncture, an axial tensile force is then applied to the plug while the flanged end thereof is maintained in fixed relation to the puncture to stretch the opposite end of the plug into and through the puncture, and the tensile force is thereafter released to contract the flexible plug into close proximity with the walls of the puncture and thereby effectively seal the tubeless tire or other elastomeric product.

A preferred embodiment of the puncture repair device thus utilized is illustrated in the accompanying drawing, in which:

FIGURE 1 is a perspective view, partially in cross-section through the repair plug inserting device;

FIGURE 2 is a view similar to FIGURE 1, showing the shaft element of the device fully inserted into the repair plug; and FIGURES 3–6 are similar views, illustrating the successive stages in the insertion of a repair plug into a puncture in an elastomeric body.

Referring now to the figures, the repair device, indicated generally at 10, includes a hollow handle 11 with a hand grip 12 on one side of its substantially cylindrical body. The handle is provided with an integral flanged base 13 having an aperture 14 extending axially therethrough. A shaft 20 extends lengthwise of and through the hollow handle 11. One end 21 of the shaft is threaded and is engaged with a corresponding internally threaded end 22 of handle 11, the opposite, unthreaded end 23 of the shaft having a decreased diameter and extending lengthwise of handle 11. The threaded end 221 of shaft 20 is provided with an adjustment member 24 in the form of, for example, a hexagonal nut which, when turned, effects longitudinal movement of shaft 20 relative to handle 11 by virtue of the threaded engagement of such elements.

Repair plug 30 used in connection with the apparatus and method hereof is comprised of a substance, for instance rubber, which is useful for repairing punctures in elastomeric products, e.g., tubeless tire casings. Plug 30 is capable of being stretched in its longitudinal direction to over three times its unstretched length (compare FIGURES 1 and 2). The plug has an apertured flange 31 formed integrally with an extensible portion 32 terminating in a beaded end 33. The extensible portion 32 of repair plug 30 is desirably corrugated, having about six ribs spaced along the plug transversely thereof to facilitate stretching of portion 32 and to create a number of relatively sharp ribs adapted to bear against the surface of a puncture in the elastomeric product casing to insure a secure sealing fit for the repair plug.

Plug 30 may be tapered along its length with the rib 34 (see FIGURE 2) closed to flange 31 having a greater diameter than the rib 35 closest to end 33. For example, rib 34 may have a diameter of $19/32$ inch, with rib 35 having a diameter of ½ inch. This causes the upper end of extensible portion 32 to bear with even more force against the inner surface of the puncture hole when the plug insertion is completed, thereby assuring an even tighter fit around the top of the puncture, where it is most needed.

As noted above, the repair plug is hollow, having one open end defined by aperture 36 in flange 31, which aperture extends lengthwise of extensible portion 32 and terminates short of end 33 thereof. The aperture has a diameter sufficiently larger than that of end 23 of the movable shaft 20 to permit insertion of the shaft into the repair plug to effect stretching thereof. For instance, aperture 34 may extend through 75% of the length of the unstretched plug 30 and may have a diameter of $3/16$ inch.

In operation, the device of the invention is utilized in the method hereof employing the following technique, referring initially to FIGURE 1 of the drawing. Adjustment member 24 is first rotated to retract shaft 20 sufficiently so that the end 23 thereof is spaced from the apertured flange 13 of handle 11. Portion 32 of a repair plug 30 is then inserted through aperture 14 of flange 13 so that the flange 31 of the repair plug is supported by and bears against the adjacent surface of the flange. By turning member 24, the shaft 20 is then traversed longitudinally through handle 11, thereby moving end 33 of the shaft into aperture 36 of the plug. Further rotation of member 24 moves ends 23 of shaft 20 towards the end 37 of aperture 36 (see FIGURE 2). Still further turning of member 24 causes end 23 to bear against the material of the flexible plug, the tensile force thus produced stretching the plug along its length and concomitantly reducing the width dimension thereof. Such is continued until translation of shaft 20 is such that the base of the adjustment member engages the surface of handle 11 at end 22 thereof.

Repair plug 30 is now ready for insertion into a puncture 41 in the casing 40 of, for example, a tubeless tire 40. It should be noted that no previous hole widening operation need be performed and no expansion collar need be placed around the repair plug during insertion. If desired, a lubricant may be applied to the outer surface of portion 32 of the repair plug to ease its insertion. However, it has been found that the use of such a lubricant is not necessary to the operation of the instant device.

End 33 of the plug 30 is placed in puncture 41. A downward pressure on the repair device forces the repair plug into and through aperture 41. When the flanged base 13 engages the upper surface of casing 40 (FIGURE 3), the plug has been fully inserted.

As shown in FIGURE 4, after inserting repair plug 30 the adjustment member 24 is rotated to retract shaft 20, thereby withdrawing the end 23 thereof from the repair plug. As the shaft is withdrawn, the tensile force on the walls of the repair plug is concurrently removed, the plug resuming its normal shape. Corrugation rib 35, due to the deformation of end 33, is squeezed outward to form a shoulder which anchors the bead-like end 33 of the plug behind the inner surface 42 of the hollow casing 40.

Removal of the shaft 20 from the repair plug also effects compression of the plug 30 lengthwise thereof. Moreover, the diameter of portion 32 of the plug is concurrently expanded, causing the corrugations on the plug surface to be pressed into the inner surface of the puncture 41. A secure, sealing fit between the repair plug 30 and the inner surface of the puncture 41 is thus formed, thereby anchoring the repair plug without the necessity for the application of adhesive to the interface.

Referring now to FIGURE 5, a sharp instrument 50, e.g., a knife blade, is finally inserted under flange 31 of the plug, between such flange and the adjacent surface of base 13. The sharp instrument thereby cuts the flange from the repair plug, permitting removal of the repair device 10 for re-use. As shown in FIGURE 6, the repair job is thus completed, the compressed plug 30 properly seated in and sealing puncture 41.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claim.

The embodiments of the invention in which an exclusive privilege or property is claimed are defined as follows:

1. A device for inserting a flexible, hollow repair plug into an elastomeric product, which device comprises a hollow handle; a shaft extending through said handle; support means integral with said handle for fixedly mounting at least one end of said plug annularly thereof comprising a flange having an aperture disposed coaxially with said shaft of a cross-section sufficient to permit movement of the shaft and the leading portion of said plug longitudinally therethrough, said flange including an annular bearing surface for engaging and seating a portion of said plug thereon to permit stretching and elongation of the plug by said shaft; and means for moving said shaft lengthwise of and through said handle comprising means integral with said shaft received in and in threaded engagement withh said handle and said plug to stretch the plug away from said support means and thereby reduce the thickness of the flexible plug to permit insertion into said product.

References Cited

UNITED STATES PATENTS

| | | | |
|---|---|---|---|
| 581,641 | 4/1897 | Wolf | 81—15.7 |
| 2,095,931 | 10/1937 | Kraft | 152—370 |
| 2,920,515 | 1/1960 | Mays | 81—15.7 |

FOREIGN PATENTS

| | | |
|---|---|---|
| 64,066 | 3/1913 | Austria. |

OTHELL M. SIMPSON, *Primary Examiner.*